United States Patent [19]
Olsaker

[11] 3,947,078
[45] Mar. 30, 1976

[54] ROTARY SCREW MACHINE WITH ROTOR THRUST LOAD BALANCING

[75] Inventor: Oleif Olsaker, Michigan City, Ind.

[73] Assignee: Sullair Corporation, Michigan City, Ind.

[22] Filed: Apr. 24, 1975

[21] Appl. No.: 571,472

[52] U.S. Cl............. 308/207 R; 418/203; 308/219
[51] Int. Cl.² ......................................... F16C 13/00
[58] Field of Search........ 308/207 R, 208, 212, 213, 308/143, 128, 232; 418/203, 197, 189

[56] References Cited
UNITED STATES PATENTS
3,388,854  6/1968  Olofsson et al. ................... 418/203

*Primary Examiner*—Robert R. Song
*Assistant Examiner*—Richard A. Bertsch
*Attorney, Agent, or Firm*—Wegner, Stellman, McCord, Wiles & Wood

[57] ABSTRACT

A bearing assembly for the rotors of a rotary screw variable volume gas machine, as a compressor expander or fluid pump, includes opposed thrust and high radial load bearings at the high pressure end of each rotor and high thrust bearings for each rotor shaft at the low pressure end. An axial force is applied to each of the bearings at the low pressure end, opposing the axial load on the screws from the working fluid, tending to equalize the thrust load on the bearings at the high pressure end so that bearing wear is relatively even and bearing life is improved.

18 Claims, 5 Drawing Figures

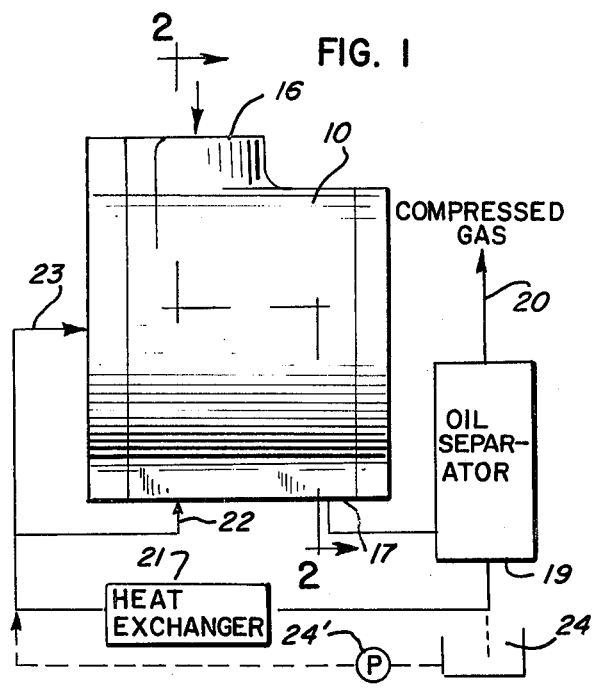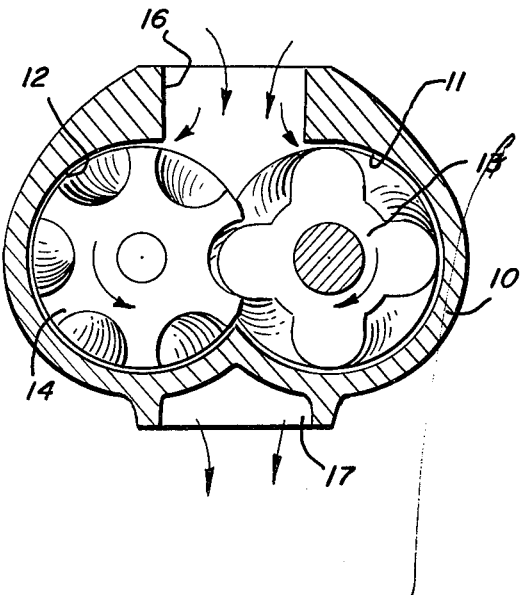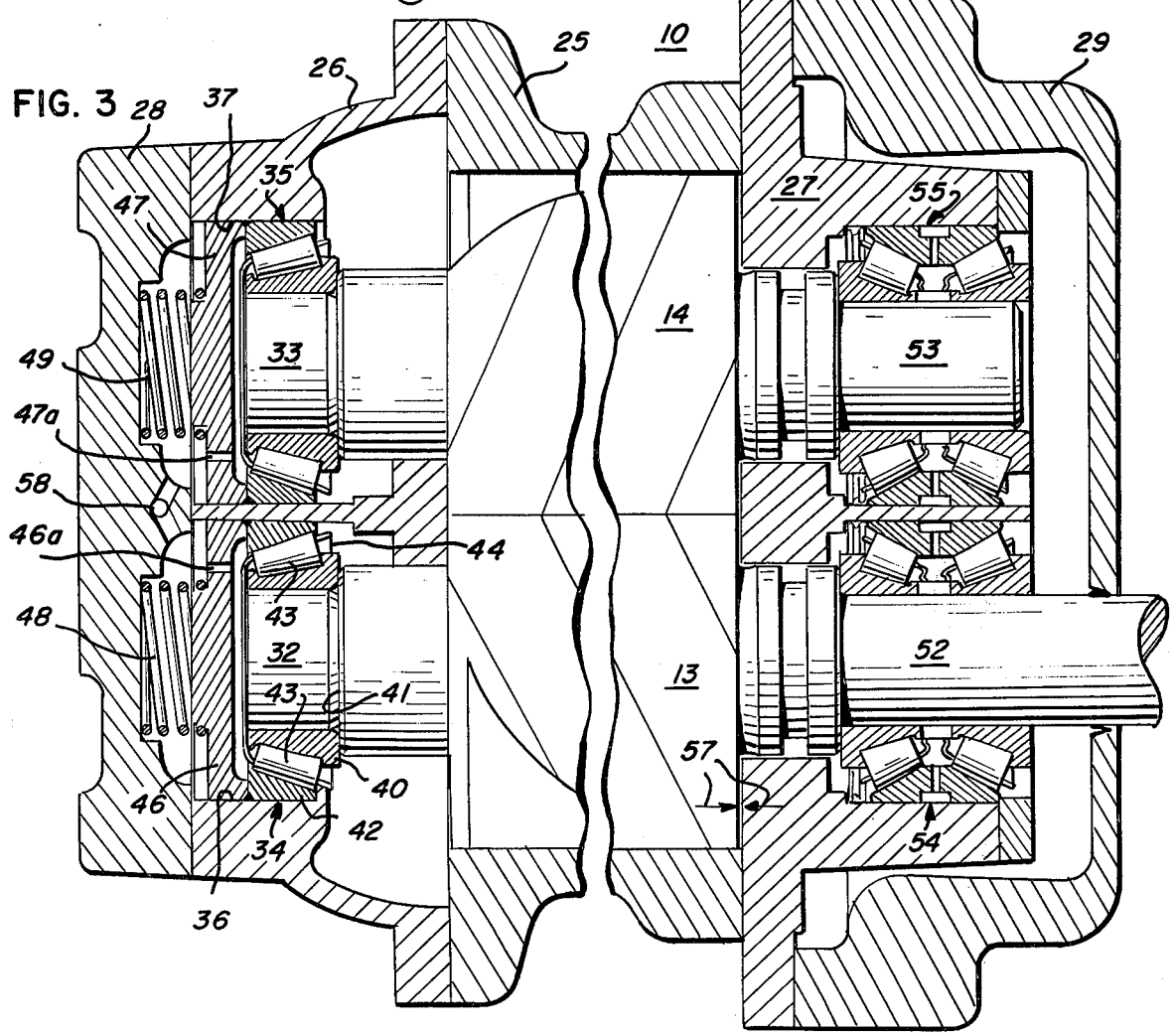

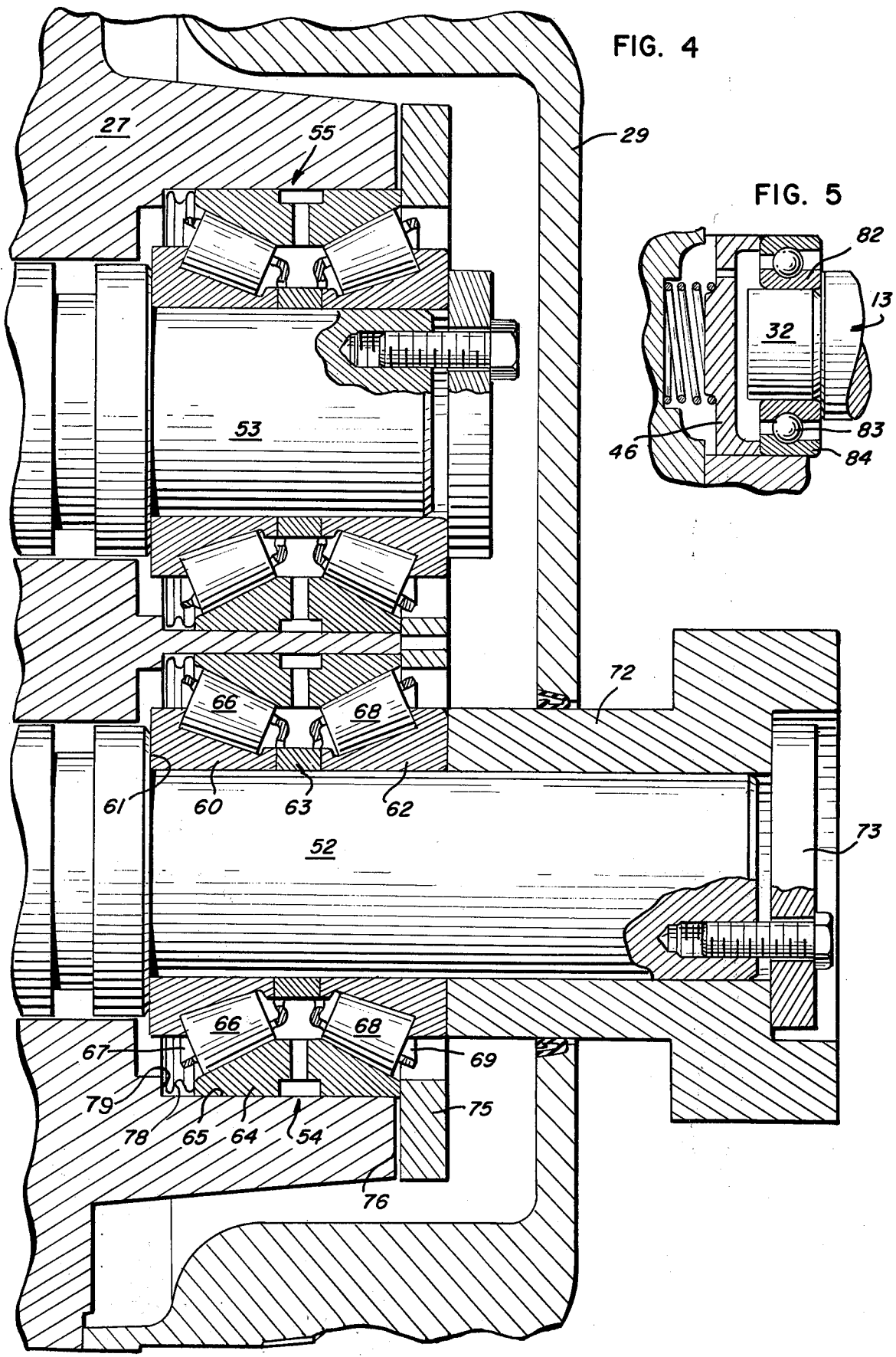

ROTARY SCREW MACHINE WITH ROTOR THRUST LOAD BALANCING

BACKGROUND OF THE INVENTION

The invention relates to a bearing assembly for a rotary screw gas machine. A typical rotary screw machine has a housing with two axially extending intersecting bores, a low pressure connection at one end a high pressure connection at the other end. Two rotors with complementary intersecting spiral screws are rotatable in the bores and are carried by bearings mounted in the end walls of the housing. Typically, it is the bearings of a rotary screw machine which are the first component to fail in normal operation. Bearing size is limited by the center-to-center spacing of the rotors, and cannot be increased to provide a heavier bearing. Accordingly, it is desirable that the thrust loads be distributed between the bearings at the low pressure end and high pressure end and the appropriate bearing characteristics be selected for maximum bearing life.

The most common rotary screw gas machine is the gas compressor, widely used for compressing air and in refrigeration systems. Much of the following discussion will be concerned with the machine as a gas or air compressor. The novel bearing assembly may, however, be used with other rotary screw gas machines having a pressure differential between the inlet and outlet.

The radial bearing load at the low pressure end of the machine is relatively small as the fluid between the rotors is at a low pressure. In an air compressor, the pressure at the inlet is atmospheric. Conversely, at the high pressure end, the fluid trapped between the rotors is at high pressure and there is a substantial radial load on the high pressure end bearings. The high pressure fluid at the high pressure end is trapped between the end faces of the rotors and the end wall of the housing. This establishes a substantial axial force on the rotors. It is desirable that the rotors be fixed axially in the housing so that the end faces of the rotors have a substantially fixed clearance from the end wall at the high pressure end of the housing. A variable clearance, as that necessary to accommodate thermal expansion of the rotors, is provided at the low pressure end of the housing. This relationship requires that the bearings at the high pressure end support a large thrust load in addition to the large radial load.

THE PRIOR ART

Early rotary screw machines utilized duplex ball bearings at the high pressure end. In such ball bearings, the balls have double angular contact with each race, fixing the rotors axially in the housing. These bearings are quite expensive.

More recently it has been proposed in Olofsson et al. U.S. Pat. No. 3,388,854 that each rotor be mounted with a combination of roller and ball bearings at each end. The main thrust load bearing is provided at the high pressure end. Springs between the bearings for each rotor at the low pressure end fix the rotors axially and prevent them from hitting the outlet end of the housing. A piston acting on the outer race of the ball bearing for one of the rotors at the low pressure end divides the thrust load between the bearings at each end. The construction shown in this patent utilizes identical bearings at each end of each rotor; and does not take into consideration the fact that there is a high radial load at the high pressure end and relatively little radial load at the low pressure end.

SUMMARY OF THE INVENTION

In accordance with a principal feature of the invention, the rotors of a screw fluid machine have a pair of axially opposed thrust and high radial load bearings between each rotor shaft and the housing at the high pressure end, a high thrust capacity bearing between each rotor shaft and the housing at the low pressure end, and means for applying an axial force to the rotors which tends to oppose the thrust load on the rotors caused by working fluid pressure difference.

More particularly, the opposed thrust bearings at the high pressure end are opposed tapered roller bearings. The high thrust bearing at the low pressure end is a steep tapered roller bearing. Alternatively, the high thrust bearing at the low pressure end is an angular contact ball bearing.

Another feature of the invention is that the axial force applying means includes a cylinder defined by the housing wall, aligned with the rotor shaft and a nonrotating piston movable axially within the cylinder and engaging and applying the axial equalizing force to the outer bearing cup of the low pressure end bearing.

A further feature is that the rotary screw machine has an oil system maintained at high pressure and including a connection from the oil system to the pistons.

Still another feature is a spring acting on the piston to center the low pressure end bearing in the absence of other pressure on the piston.

Further features and advantages of the invention will readily be apparent from the following specification and from the drawings, which deal specifically with a rotary screw compressor; however, the principles described could equally well be applied to a rotary screw expander or fluid pump:

FIG. 1 is a diagrammatic view of a rotary screw compressor and cooling system;

FIG. 2 is a transverse broken section taken generally along line 2—2 of FIG. 1;

FIG. 3 is an enlarged longitudinal section through the compressor with the center portion omitted;

FIG. 4 is a fragmentary enlarged longitudinal section through the bearings at the outlet end of the compressor; and FIG. 5 is a fragmentary drawing illustrating a high thrust angular contact ball bearing at the compressor inlet.

A typical rotary screw compressor is illustrated diagrammatically in FIGS. 1 and 2. Housing 10 has axially extending intersecting bores 11 and 12 which receive a male rotor 13 and female rotor 14. Spiral lobes and grooves on the rotors 13, 14 mesh as the rotors turn. Gas is drawn in at inlet 16, trapped within the housing, compressed as the lobes mesh and discharged at outlet 17. In an expander, high pressure gas supplied to port 17 drives the rotors and, following expansion, is discharged at port 16.

The temperature of the compressor is controlled by the introduction of a suitable coolant, such as mineral oil, which also serves to lubricate the rotors and to provide a seal between the rotors and between each rotor and the housing. The compressed gas from outlet 17 is connected with an oil separator 19. Essentially oil-free compressed gas is delivered at 20 and the oil is recycled, under pressure from the compressed gas, through heat exchanger 21 to the compressor at 22 and to the inlet bearings at 23, as will be described in more detail below. Alternatively, the oil from separator 19 may be drained to a sump 24 and recycled by pump 24' at a controlled pressure independent of and, if desired, exceeding the pressure of the compressed gas.

The housing 10 has a generally cylindrical body 25 with inlet and outlet end plates 26, 27 and inlet and outlet covers 28, 29, FIG. 3. The rotors 13, 14 have shafts extending from each end, which are supported in bearings carried in the end plates 26, 27.

More particularly, rotors 13, 14 have shafts 32, 33 at the inlet end supported by tapered roller bearings 34, 35 received in bores 36, 37 extending through the inlet end plate 26. The bearings 34, 35 are steep tapered roller bearings which are particularly suited for carrying a substantial axial load or thrust. The bearings for the two shafts are identical and only one will be described in detail.

The bearing 34 has a cone or inner race 40 mounted on shaft 32 and seated against shoulder 41. Cup or outer race 42 is received in bore 36 of inlet end plate 26. The rollers 43 are held in a cage 44 between the cone and the cup. Bores 36, 37 serve as cylinders in which nonrotating pistons 46, 47 are axially movable to apply a force through thrust bearings 34, 35 to the rotors, opposing the axial force generated by working fluid pressure difference. Coil springs 48, 49 behind the pistons, establish a minimum axial force which centers the cup of each bearing with respect to the cone, in the absence of other pressure on the piston. The angle of the conical surface of the cup with respect to the bearing axis is a factor in determining the thrust load which the bearing will handle. Increasing the bearing cup angle increases the ratio of thrust to radial rating for the bearing. A bearing with a cup angle in excess of about 22° is considered steep angle or high thrust bearing.

Shafts 52, 53 for the rotors at the outlet end are each supported by a pair of axially opposed tapered roller bearings 54, 55. The compressed gas between the rotors at the outlet end exerts a substantial radial force on the rotors. Accordingly, the bearings 54, 55, to withstand the high radial load, have a lesser taper than inlet bearings 34, 35. Rotors 13, 14 are subjected to a substantial axial load from the compressed gas which is present between the inner end surface of end plate 27 and the end face of the rotors, where a running clearance indicated by the arrows at 57 is provided. Maximum life for opposed bearings 54, 55 is achieved when the axial load in the two halves of each bearing is balanced. Accordingly, a pressure medium introduced in the cylinders behind pistons 46, 47 exerts a pressure on the inlet bearings opposing the pressure of the compressed gas on the end faces of the rotors, minimizing the thrust load carried by the outlet end bearings. Preferably, the pressure is provided by the cooled oil from the separator 19, introduced to the two cylinders through passage 58. Ports 46a, 47a through the pistons direct a flow of oil to the bearings, to provide lubrication. The pressure on oil in the cylinders may be provided by the gas pressure or by pump 24.

The construction of the outlet end bearings is shown on an enlarged scale in FIG. 4. The bearings for the two rotors are identical and only that for the main rotor 13 will be described in detail. The innermost of the two opposed bearings has a cone 60 seated against a shoulder 61 on shaft 52. The outer bearing has a cone 62 located with respect to the cone 60 by a spacer ring 63. A double cup 64 is located in bore 65 which extends through outlet end member 27. The inner bearing has rollers 66 positioned between cones 60 and cup 64 by cage 67. The outer bearing has rollers 68 positioned between cone 62 and cup 64 by cage 69.

Cones 60, 62 are held against the shoulder 61 by a shaft coupler 72 which extends out through cover 29 for connection with the prime mover (not shown) and is held to the shaft by a retainer 73. Double cup 64 is held in bore 65 by a cup retainer 75 secured to the end plate 27. The axial position of cup 64 establishes the end clearance between the inner face of end plate 27 and the end surface of the rotors. The spacing may be selected by providing an appropriate shim 76 between retainer 75 and end plate 27. Preload of the double cup 64 to maintain contact between 62 and 73 is accomplished by a bellows spring 78 between the inner edge of the double cup 64 and shoulder 79.

The radial load on the rotors at the outlet end is divided between the two halves of the axially opposed tapered bearings. By virtue of the equalizing thrust applied to the high thrust bearings at the inlet, there is little thrust load in either of the bearings at the outlet. Accordingly, wear on the two bearings is substantially equal and bearing life is maximized.

FIG. 5 illustrates a high thrust angular contact ball bearing which may be utilized at the low pressure end of the machine. Rotor shaft 32 extends into inner ball race 82 which has a symmetrical channel in which balls 83 rotate. Outer ball race 84 has an unsymmetrical ball race providing angular contact with balls 83 to accommodate the axial force applied by piston 46 opposing the working fluid pressure on the rotor.

I claim:

1. A bearing assembly for the rotors of a rotary screw gas machine having a housing with a low pressure port at one end and a high pressure port at the other, main and gate rotors having shafts on which the rotors are mounted for rotation in the housing, the rotors having meshing spiral lobes and grooves which trap gas while moving it between the ports, the rotor being subject to a low radial load at the low pressure end, a high radial load at the high pressure end and to an axial load urging the rotors toward the low pressure end, said bearing assembly including:
   a pair of axially opposed thrust and high radial load bearings between each rotor shaft and the housing at the high pressure end;
   a high thrust bearing between each rotor shaft and the housing at the low pressure end; and
   means for applying an axial force to the rotors tending to equalize the thrust load on the opposed thrust bearings at the high pressure end.

2. The bearing assembly of claim 1 having opposed tapered roller bearings at the high pressure end.

3. The bearing assembly of claim 2 in which each opposed tapered roller bearing has inner cones on the rotor shaft, outer cups mounted in the housing, rollers between the cones and cups, and a cup retainer fixing the cup position and thus the rotor position with respect to the housing.

4. The bearing assembly of claim 3 including a shim positioning the cup retainer with respect to the housing, to establish the position of the rotors within the housing.

5. The bearing assembly of claim 3 including a spacer spring holding the outer cups against the cup retainer.

6. The bearing assembly of claim 5 in which said spacer spring is a bellows.

7. The bearing assembly of claim 1 in which the low pressure, high thrust bearing is a tapered roller bearing.

8. The bearing assembly of claim 1 in which the low pressure, high thrust bearing is an angular contact ball bearing.

9. The bearing assembly of claim 1 in which said low pressure bearing has an outer race, movable with respect to the housing and the axial force is applied to the outer race.

10. The bearing assembly of claim 9 in which the housing has a low pressure end plate with cylinders for the pistons formed therein.

11. The bearing assembly of claim 10 in which each piston has a hole therethrough, together with means for directing lubricant through the hole to the low pressure bearing.

12. The bearing assembly of claim 9 in which the axial force applying means includes a cylinder defined by the housing wall and aligned with the rotor shaft, and a nonrotating piston movable axially within the cylinder.

13. The bearing assembly of claim 12 in which the low pressure bearing has a bearing cone and said outer race is movable axially with respect to said cone, and including a spring applying an axial force to said piston to center the race with respect to the cone, in the absence of other pressure on the piston.

14. The bearing assembly of claim 9 in which the machine is a compressor, and the force applied to the bearing race is a function of the discharge pressure of the compressor.

15. The bearing assembly of claim 14, in which a piston applies the force to the bearing race and the compressor has a cooling oil system with means maintaining the system above the pressure of the compressor discharge and including a connection from the cooling oil system to said piston.

16. The bearing assembly of claim 14 in which a piston applies the force to the bearing race and the compressor has a cooling oil system maintained at the discharge pressure of the compressor and including a connection from the cooling oil system to said piston.

17. The bearing assembly of claim 16 in which the force applied to the bearing cup is a function of the discharge pressure of the compressor.

18. A bearing assembly for the rotors of a rotary screw gas machine having a housing with a low pressure port at one end and a high pressure port at the other, main and gate rotors having shafts on which the rotors are mounted for rotation in the housing, the rotors having meshing spiral lobes and grooves which trap gas while moving it between the ports, the rotor being subject to a low radial load at the low pressure end, a high radial load at the high pressure end and to an axial load urging the rotors toward the low pressure end, said bearing assembly including:
- an axial locating bearing with high radial load capability and some thrust capability between each rotor shaft and the housing at the high pressure end;
- a high thrust bearing between each rotor shaft and the housing at the low pressure end; and
- means for applying an axial force to the rotors tending to equalize the thrust load on the opposed thrust bearings at the high pressure end.

* * * * *

UNITED STATES PATENT OFFICE
CERTIFICATE OF CORRECTION

PATENT NO. : 3,947,078
DATED : March 30, 1976
INVENTOR(S) : OLEIF OLSAKER

It is certified that error appears in the above—identified patent and that said Letters Patent are hereby corrected as shown below:

Column 4, line 17, change "between 62 and 73" to -- between 62 and 72 --.

Signed and Sealed this

Thirty-first Day of August 1976

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,947,078
DATED : March 30, 1976
INVENTOR(S) : OLEIF OLSAKER

It is certified that error appears in the above-identified patent and that said Letters Patent are hereby corrected as shown below:

In claim 1, column 4, line 42, delete "rotor" and substitute therefor --rotors--.

In claim 18, column 6, line 21, delete "rotor" and substitute therefor --rotors--; line 26, delete "an axial locating bearing" and substitute therefor --opposed axial locating bearings--.

Signed and Sealed this

Twenty-fourth Day of May 1977

[SEAL]

Attest:

RUTH C. MASON
Attesting Officer

C. MARSHALL DANN
Commissioner of Patents and Trademarks